Feb. 14, 1933.        E. F. DURNAN        1,897,553
ENGINE
Filed March 21, 1930

INVENTOR.
EDGAR F. DURNAN.
BY Munn & Co.
ATTORNEYS.

Patented Feb. 14, 1933

1,897,553

UNITED STATES PATENT OFFICE

EDGAR FRANKLIN DURNAN, OF SAN FRANCISCO, CALIFORNIA

ENGINE

Application filed March 21, 1930. Serial No. 437,842.

My invention relates to improvements in engines, and it consists in the combinations, constructions and arrangements hereinafter described and claimed.

An object of my invention is to provide an engine in which the connecting rod disposed between the piston and the crank shaft is permitted to reciprocate but only in the direcion of its longitudinal axis. A guide is provided for preventing the swinging of the connecting rod during its movement. The connecting rod has a slotted end that receives a slidable block, and this block has an opening for rotatably receiving the crank shaft. By this mechanical means the reciprocating motion of the piston is changed into a rotary motion.

The principal object of the invention is to offset the slotted end of the connecting rod so that the power stroke of the piston will take place while the connecting rod is disposed directly above the sliding block. During the exhaust and the compression strokes, the block is disposed in the portion of the slot furthest removed from the connecting rod. It is obvious that less force is applied between the connecting rod and the block during these two strokes than during the power stroke.

The device also makes use of novel means for guiding the connecting rods, this means also directing oil to the rods so as to keep them lubricated at all times.

Other objects and advantages will appear as the specification proceeds, and the novel features of the device will be particularly pointed out on the claim hereto annexed.

My invention is illustrated in the accompanying drawing, in which.

Figure 1:
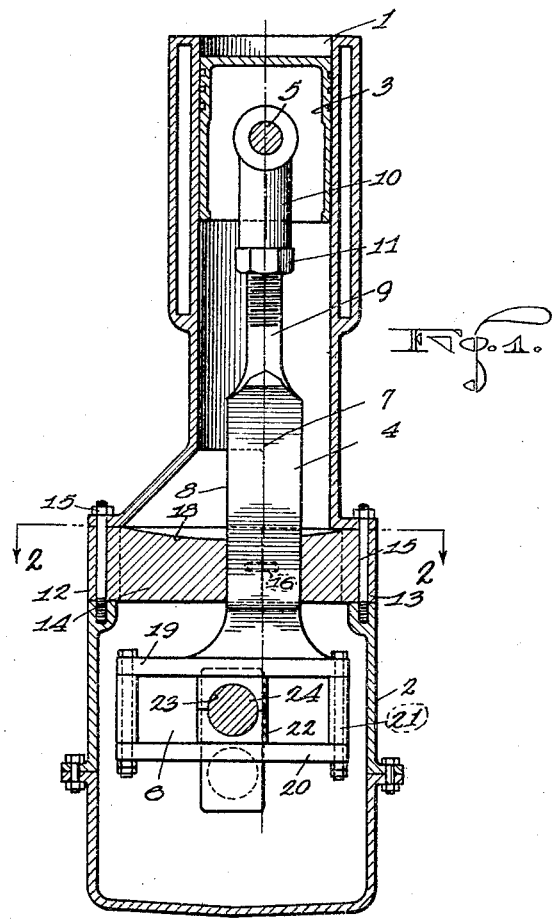
Figure 1 is a vertical section through the device.

In carrying out my invention, I provide an engine which comprises a cylinder 1 and a crank case 2. Within the cylinder I mount a piston 3. A connecting rod 4 of the shape shown in Figure 1 is secured to the piston 3 by a wrist pin 5, and the rod 4 has a slotted end 6 that is offset with respect to the longitudinal axis 7 of the rod. The purpose of this will be described later.

The rod 4 has a flat portion 8 rectangular in cross section, and this portion merges into a round threaded end 9. This end is screwed into a tubular member 10 which in turn is pivotally mounted on the wrist pin 5. The purpose of the pivotal connection is to permit slight adjustment of the piston with respect to the rod so as to prevent any binding of the piston in the cylinder. The piston 3 may be adjusted on the rod 4, and when in the proper position a lock nut 11 may be tightened for securing the piston in place.

Figure 2:
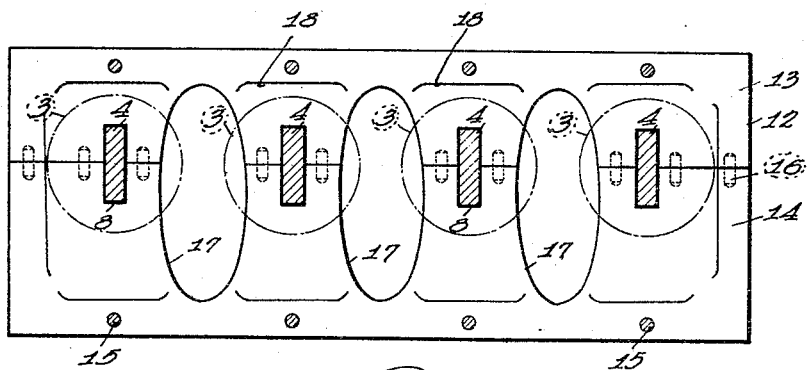
Figure 2 is a section along the line 2—2 of Figure 1.

In Figures 1 and 2 I show a guide for the connecting rod 4. The present drawing shows a four cylinder engine, and therefore Figure 2 shows four connecting rods 4. The guide 12 consists of two pieces 13 and 14 that are disposed between the engine block and the crank case. The pieces are made as thick as necessary to provide a guide of a sufficient length. Bolts 15 or other suitable fastening means secure the guide 12 in place and also secure the engine block to the crank case 2.

The two pieces 13 and 14 are held together by dowel pins 16. In order to lighten the guide 12, I provide openings 17, and these openings also permit excess oil to drain back into the crank case, and further permit oil splashed by the crank shaft to be delivered on top of the guide 12.

Depressions 18 are formed in the upper surface of the guide 12 as shown in Figures 1 and 2, and the lowest points of these depressions are disposed adjacent to the connecting rods 4. These depressions will hold shallow bodies of oil that will provide a continual feed of lubricant to the connecting rods. Any excess oil will overflow the depressions and will pass through the openings 17 into the crank case 2.

The lower end of each connecting rod 4 is provided with a plate-like portion 19 which is offset with respect to the axis 7 of the rod. The midpoint of the plate is placed one-fourth of a stroke to the left in Figure 1 of the center line 7. A second plate 20 similar to the plate 19 is secured to the plate 19 by bolts 21 or other suitable fastening means.

A block 22 consisting of two sections is slidably mounted in the slide or slot 6 formed by the plates, and the block has a bore 23 therein for receiving a crank shaft 24.

From the foregoing description of the various parts of the device, the operation thereof may be readily understood.

The parts shown in Figure 1 assume this position at the moment of firing, or, in other words, at the start of the power stroke. The crank shaft 24 rotates in a clockwise direction when looking at Figure 1, and when the piston 3 reaches one-fourth the distance of its power stroke, the offset portion of the crankshaft will be in a direct line with the axis 7 of the rod 4. When the piston reaches the midpoint of its stroke, the crank shaft will be disposed as far to the right of the line 7 as it is shown disposed to the left of the same line in Figure 1. At the three-fourths point of the power stroke, the crank shaft will again pass the axis line 7, and at the end of the power stroke the crank shaft will be disposed directly below the point at which it is shown in Figure 1.

It will therefore be seen that during the entire power stroke the offset portion of the crank shaft is disposed directly beneath the rectangular portion 8 of the connecting rod 4. The offset portion moves substantially the width of the piston 3 during the power stroke. The power stroke is followed by the exhaust stroke, which causes the block 22 to move to the left end of the slot 6. The intake stroke follows, in which the block 22 moves to the right hand end of the slot 6. The compression stroke again moves the block 22 to the left of the slot, and this is followed by the power stroke. The connecting rod is disposed on the side of the slot 6 where the greatest force is exerted, and this will cause a greater amount of power to be delivered from the piston to the crank shaft.

Due to the straight action of the connecting rod, the piston is half way down its stroke or half way up on its stroke when the crank shaft is half way between top and bottom dead center. This is not true of the pendulum action motor, because the piston in this type of motor travels further on the first and fourth quarter of the circle than on the second and third quarter due to the pendulum action of the connecting rod around the wrist pin. In my motor the equal travel of the piston and the equal amount of lost motion at each end of each stroke retards the speed of the moving forces, thereby eliminating vibration. The engine has more power, speed, and no vibration because of the doing away with the pendulum action. There is less cubic inch piston displacement, which means less fuel consumption because of shorter stroke.

Although I have shown and described one embodiment of my invention, it is to be understood that the same is susceptible of various changes, and I reserve the right to employ such changes as may come within the scope of the claim hereto annexed.

I claim:

An engine comprising a cylinder, a piston mounted therein, a connecting rod secured to the piston and being rectangular in cross section, a guide for the rod, and a crank shaft disposed off center with respect to the axis of the rod, said rod having a slotted end for slidably receiving the off-set portion of the crank shaft, the width of the rod being equal to the swing of the off-set portion during the firing stroke.

EDGAR FRANKLIN DURNAN.